Oct. 4, 1955 C. M. VANCE 2,719,691
ADJUSTABLE REAR VIEW MIRROR ASSEMBLY FOR VEHICLES
Filed Nov. 17, 1953
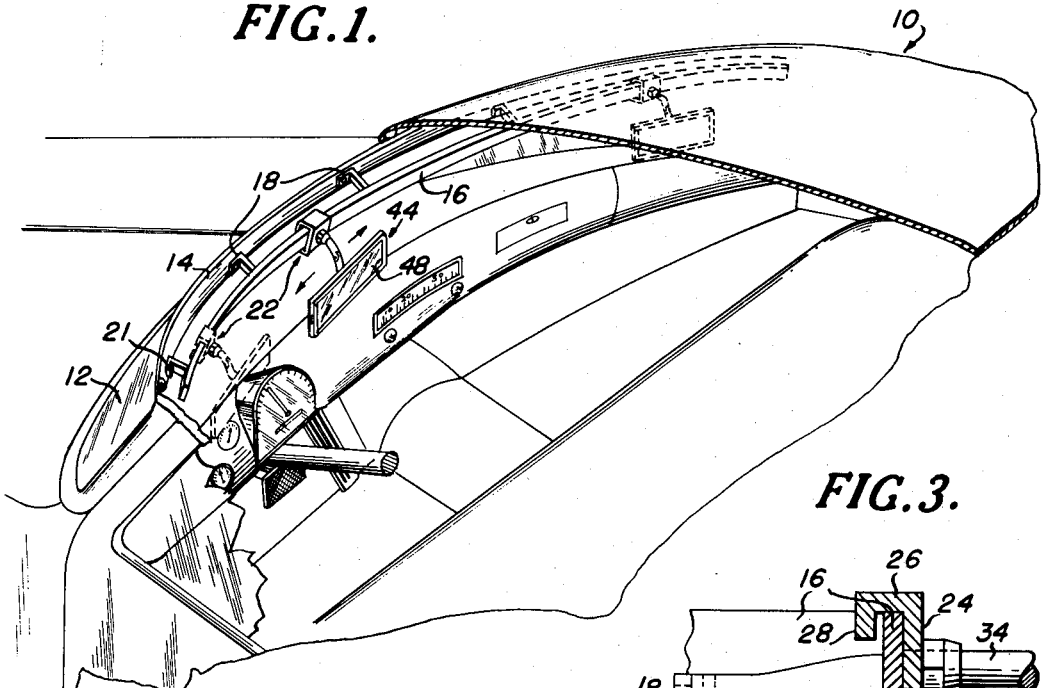
FIG.1.
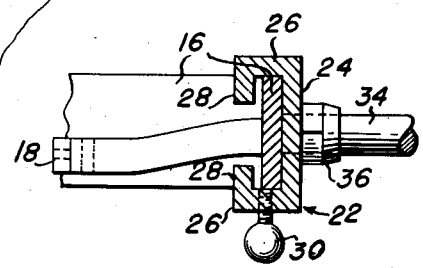
FIG.3.
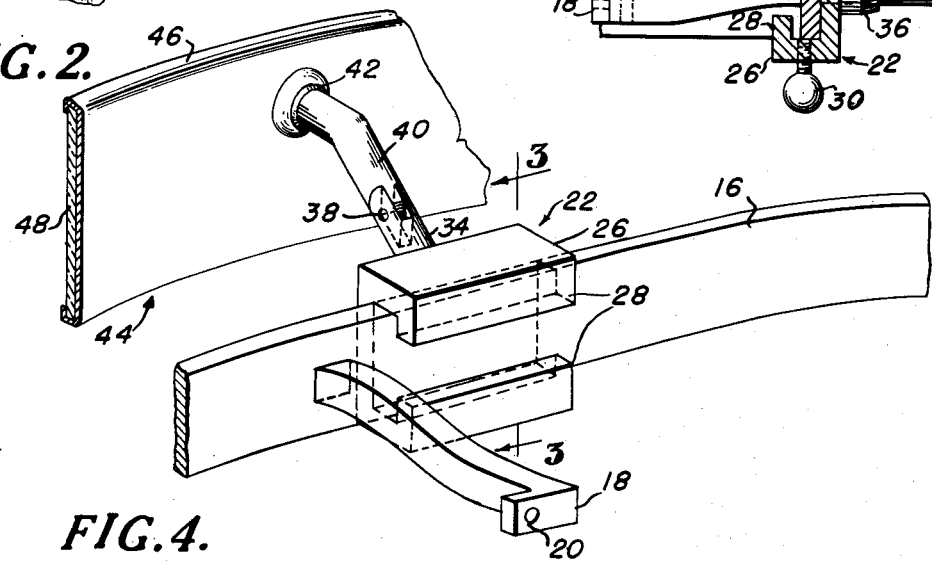
FIG.2.
FIG.4.
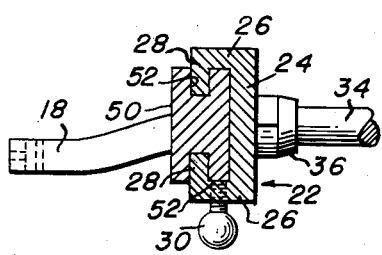
INVENTOR
Charles M. Vance
BY
Cushman, Darby & Cushman
ATTORNEYS 2,719,691

United States Patent Office

Patented Oct. 4, 1955

2,719,691

ADJUSTABLE REAR VIEW MIRROR ASSEMBLY FOR VEHICLES

Charles M. Vance, Atlanta, Ga.

Application November 17, 1953, Serial No. 392,639

2 Claims. (Cl. 248—208)

This invention relates to rear view mirrors for automobiles and other vehicles and more particularly to a novel mounting therefor.

The primary object of the invention is the provision of a mounting for rear view mirrors which enables the mirrors to be moved horizontally parallel to the windshield and vertically in a plane perpendicular to the windshield so as to be readily adjusted to suit the individual needs of the driver.

Another object of the invention is the provision of a support capable of receiving a plurality of individual mirror units across substantially the full width of the automobile, each of which is individually adjustable so as to give the driver full rear vision.

A further object of the invention is the provision of a rear view mirror assembly of sturdy but simple construction which may be readily mounted on an automobile so as to be free from vibration and annoying rattle.

A still further object of the invention is the provision of a rear view mirror assembly having a mirror unit which is capable of being used as a sun visor in one of its adjusted positions.

These and other objects of the invention will become apparent during the course of the following detailed description and the appended claims.

The invention may be best understood with reference to the accompanying drawings in which an illustrative embodiment is shown. In the drawings:

Figure 1 is a fragmentary perspective view of an automobile showing one embodiment of the present invention applied thereto;

Figure 2 is a fragmentary perspective view of the rear view mirror assembly of the present invention;

Figure 3 is a partial sectional view taken along the line 3—3 of Figure 2; and

Figure 4 is a view similar to Figure 3 showing a modified form of the invention.

Referring to the drawings, 10 designates an automotive vehicle having a windshield 12 and a windshield molding 14, all of which is conventional and well-known, and forms no part of the present invention.

The rear view mirror assembly of the present invention comprises an elongated supporting bar 16 which is adapted to extend across substantially the entire width of the vehicle 10. As shown in Figure 1, the supporting bar 16 may be curved to conform with the curvature of the windshield 12. Extending forwardly, transversely of the bar 16 are a series of rigid attaching arms 18 spaced at intervals throughout the longitudinal extent of the bar. The forward ends of the attaching arms 18 are provided with apertured flanges 20 which are adapted to be attached to the windshield mounting 14 by suitable screws 21 or the like.

One or more U-shaped guide elements 22 are mounted on the bar 16 for sliding movement throughout its longitudinal extent. Each of the guide elements 22 comprises a vertical bight portion 24 which engages the rear surface of the bar 16, a pair of upper and lower horizontally extending legs 26 and a pair of upper and lower inwardly extending flanges 28 which engage the forward surface of the bar. The flanges 28 are spaced apart sufficiently to permit the guide elements 22 to pass freely by the attaching arms 18 spaced along the bar. In order to fix the guide elements on the bar, a wing bolt 30 is threadedly engaged through the lower leg 26 of each of said guide elements 22. The bolts 30 may be tightened against the bar to lock the guide elements thereto in any desired longitudinal position.

Each guide element 22 carries a rearwardly extending link member 34, the forward end of which is threaded and engaged in a co-operating threaded aperture in the bight portion 24 of each guide element 22. A nut 36 is mounted on each link member 34 to lock the link member to the bight portion 24. The rear end of each link member 34 extends upwardly and is bifurcated to receive the forward end of an axially aligned second link member 40. A frictional horizontal pivot 38 connects each pair of link members together. The horizontally extending rear end of each of the second link members 40 is universally secured to a mirror frame 46 of a mirror unit 44 by a ball and socket connection 42. Each of the mirror units 44 includes a rearwardly facing mirror 48 which is mounted in the mirror frame 46. In Figure 4 there is shown a supporting bar 50 of a modified cross-sectional configuration which has a groove 52 disposed in the upper and lower surfaces of the bar. The grooves 52 extend longitudinally of the bar 50 throughout its longitudinal extent and are formed to receive the inturned flanges 28 of the guide elements 22. Thus, the attaching arms 18 may extend forwardly from the front surface of the bar without interfering with the free sliding movement of the guide elements 22 along the supporting bar.

It will be seen that the horizontal supporting bar 16 may be readily adapted for attachment to any of the conventional and well-known automotive vehicles by any convenient means. For example, by securing the attaching arms 18 to the vehicle either by the screws 21 which secure the windshield molding 14 to the vehicle frame or by suitable screws secured directly to the frame. By providing a plurality of attaching arms 18 spaced at intervals along the upper portion of the windshield, a rigid, sturdy structure is provided which is free from any annoying vibration or rattle.

Since the supporting bar extends substantially the entire distance across the vehicle, more than one mirror unit can be readily mounted thereon to give an area of greater rear visibility than can be obtained by a single unit. This construction is highly advantageous in that the mirror units 44 may be adjusted along the bar so that the driver's view is not obstructed by the heads of front seat passengers and considerable side visibility can be obtained through the rear window, a result not possible with a single stationary mirror unit. If desired, the mirror unit on the passenger side of the windshield may be used by a front seat passenger without eliminating the rear vision of the driver.

It is a further feature of the invention that the jointed link structure permits the mirror units to be used as sun visors whenever desired.

It is to be understood that the form of the invention herewith shown and described is to be taken as the preferred embodiment and that various changes may be made without departing from the spirit of the invention or the scope of the appended claims.

I claim:

1. For use with a vehicle having a windshield and a frame therefor, an assembly for supporting a rear view mirror for transverse adjustment throughout substantially the entire width of the vehicle, said assembly comprising an elongated bar having a length sufficient to extend throughout substantially the entire width of the vehicle, arm means disposed throughout the longitudinal extent of said bar and rigidly extending outwardly from one side thereof, means on said arm means for securing the same to the vehicle so as to fixedly dispose said bar in spaced relationship to the upper portion of said windshield, said bar being longitudinally curved to conform generally to the curvature of the upper extent of said windshield frame, a guide element having means disposed on the opposite side of said bar for adjustably carrying a rear view mirror, said guide element being mounted on said bar for sliding movement past said arm means throughout the entire longitudinal extent thereof, and means carried by said guide element and cooperating with said bar for fixing said guide element to said bar in any adjusted position along the longitudinal extent thereof.

2. An assembly as described in claim 1 wherein said guide element is provided with a T-shaped slot having a head embracing said bar.

References Cited in the file of this patent

UNITED STATES PATENTS

| | | |
|---|---|---|
| 1,324,456 | Lutz | Dec. 9, 1919 |
| 1,342,854 | McCarroll | June 8, 1920 |
| 1,345,157 | Francisco | June 29, 1920 |
| 1,359,645 | Zink | Nov. 23, 1920 |
| 1,386,959 | Severance et al. | Aug. 9, 1921 |
| 1,814,500 | Summerbell | July 14, 1931 |
| 2,038,906 | Ruhland | Apr. 28, 1936 |

FOREIGN PATENTS

| | | |
|---|---|---|
| 257,707 | Great Britain | Sept. 9, 1926 |